United States Patent [19]
Hellweg

[11] Patent Number: 5,146,818
[45] Date of Patent: Sep. 15, 1992

[54] CAN TRIMMING APPARATUS

[75] Inventor: Siegfried Hellweg, Mount Prospect, Ill.

[73] Assignee: H. L. Fisher Mfg. Co., Inc., Des Plaines, Ill.

[21] Appl. No.: 506,855

[22] Filed: Apr. 9, 1990

Related U.S. Application Data

[63] Continuation-in-part of Ser. No. 181,209, Apr. 13, 1988, Pat. No. 4,914,990.

[51] Int. Cl.$^5$ .............................................. B23B 5/14
[52] U.S. Cl. .................................... 82/58; 82/54; 82/56; 82/82
[58] Field of Search .................. 82/46, 47, 54, 56, 57, 82/58, 61, 62, 66, 67, 82, 101, 102, 124

[56] References Cited

U.S. PATENT DOCUMENTS

| | | | |
|---|---|---|---|
| 972,828 | 10/1910 | Cosby | 82/56 |
| 2,232,021 | 2/1941 | Calleson et al. | 82/58 |
| 2,256,306 | 9/1941 | Ziegler | 83/496 |
| 2,298,366 | 10/1942 | Gladfelter et al. | 82/58 |
| 2,702,597 | 2/1955 | Wickwire et al. | 82/82 |
| 3,119,296 | 1/1964 | Foster | 83/622 |
| 3,157,080 | 11/1964 | Hanni | 82/54 |
| 3,359,841 | 12/1967 | Cvacho et al. | 82/82 |
| 3,369,433 | 2/1968 | Johansson | 83/496 |
| 3,400,620 | 9/1968 | Armbruster et al. | 82/47 |
| 3,659,486 | 5/1972 | Criss et al. | 82/48 |
| 3,750,501 | 8/1973 | Miller | 82/82 |
| 3,820,423 | 6/1974 | Miller | 82/82 |
| 3,839,933 | 10/1974 | Paramonoff | 82/82 |
| 3,864,995 | 1/1975 | Langewis | 82/54 |
| 3,878,743 | 4/1975 | Melind | 82/54 |
| 3,894,455 | 7/1975 | Stroobants | 82/56 |
| 3,916,740 | 11/1975 | Stroobants | 82/56 |
| 3,916,746 | 11/1975 | Stroobants | 83/666 |
| 3,994,251 | 11/1976 | Hake et al. | 113/7 R |
| 4,003,279 | 1/1977 | Carmichael et al. | 83/199 |
| 4,014,228 | 3/1977 | Dean | 82/53 |
| 4,046,038 | 9/1977 | West | 82/47 |
| 4,058,037 | 11/1977 | Tashiro et al. | 83/70 |
| 4,111,346 | 9/1978 | Bertolette | 225/96.5 |
| 4,181,050 | 1/1980 | Stroobants | 82/56 |
| 4,235,137 | 11/1980 | Harman | 82/73 |
| 4,283,976 | 8/1981 | Wennerstrom | 83/496 |
| 4,914,990 | 4/1990 | Hellweg et al. | 82/58 |
| 5,054,341 | 10/1991 | Johansson et al. | 82/47 |

FOREIGN PATENT DOCUMENTS 9006899 6/1990 World Int. Prop. O. .............. 82/53

OTHER PUBLICATIONS

Hellweg et al., Apparatus For Trimming Flanged Cans, U.S. Ser. No. 314,793, filed Oct. 26, 1981, abandoned about Nov. 4, 1983.

Primary Examiner—Bruce M. Kisliuk
Assistant Examiner—John A. Marlott
Attorney, Agent, or Firm—Olson & Hierl, Ltd.

[57] ABSTRACT

The apparatus includes a rotatable headstock trimmer unit including reciprocating spindles that are rotatable about a horizontal axis, one spindle having a first rotatable cutting element secured to one end thereof, the second spindle having a second rotatable cutting element disposed in the path of the first rotatable cutting element, the first and second rotatable cutting elements being adapted to engage the end portion of a can; and a rotatable tailstock unit including can supporting means that is rotatable about an axis coaxial with the horizontal axis of the second rotatable cutting element and which engages the lower end of the can. The spindles preferably move jointly relative to the tailstock assembly so that the rotatable cutting elements can engage the open upper end of the can and thereby cooperate to uniformly trim the end portion of the can.

44 Claims, 5 Drawing Sheets

CAN TRIMMING APPARATUS

RELATED APPLICATION

This application is a continuation-in-part of U.S. application Ser. No. 181,209 filed Apr. 13, 1988, now U.S. Pat. No. 4,914,990.

TECHNICAL FIELD OF THE INVENTION

The present invention generally relates to a can trimming apparatus and in particular to an apparatus for trimming the open upper end of a preformed can body.

BACKGROUND OF THE INVENTION

The use of metal cans in the beverage and food processing industries has increased dramatically over the past several decades and continues to increase. In an effort to reduce costs and preserve resources, it is desirable to manufacture metal cans with extremely thin side walls. Thus, the machines that form, trim and otherwise handle metal cans must be able to process cans in large volumes and at high speeds without damaging the relatively thin side walls.

It is conventional practice to form an unfinished can having a cylindrical configuration with a closed bottom portion and a cylindrical side wall that is open at the top end. Unfinished cans may be formed by a variety of processes including impact extrusion and deep drawing processes whereby a generally circular flat metal plate or sheet is first passed through an impact extrusion or deep drawing press where it is formed into a relatively shallow cup. The cup is then passed through an ironing press which elongates the side walls and produces a can having the desired wall thickness.

It is not possible, however, to produce a can by an extrusion or drawing process having the exact height required or having a side wall with a uniform upper edge. can bodies as initially formed are usually of nonuniform height and have irregular edges at the open top end. Subsequent to the formation of the unfinished container, it is necessary to trim the upper end of the cylinder to produce a can of a fixed height having a smooth upper edge.

It is essential that the upper edge of a can be smooth and uniform. The operation employed in many devices of the prior art for trimming or forming the upper edge of the can to attach a can lid often produces an uneven or cracked perimeter which, of course, can result in an inadequate seal between the lid and the upper edge of the can. Any imperfections such as burrs or cracks will prevent a proper seal between the lid and the can in the upper edge area.

Moreover, any metal slivers or shavings produced by an uneven circumferential cut about the can will render the can unsuitable for use in the beverage and food processing industries. Thus, the formation of a smooth upper edge is essential to efficient can making.

As an additional matter, the scrap material trimmed from the can should be efficiently separated from the trimmed can during the cutting process to avoid jamming the machine.

The elimination of such imperfections is a particularly troublesome matter in the can making industry. An apparatus is needed to avoid these problems by efficiently trimming the can with a uniform and even circumferential cut and discarding the scrap separate from the trimmed can. The irregular open edge of the can must be evenly trimmed without imperfections to produce identical mass-produced cans which can be efficiently sealed.

SUMMARY OF THE INVENTION

The present invention provides an apparatus for rapidly and accurately trimming the open upper end of a preformed can. By operation of the disclosed shearing arrangement, cans having smooth upper edges are formed, and cans are efficiently produced at high speed having a uniform length.

The apparatus positions a can between a trimmer unit of a headstock assembly and can supporting means of a tailstock assembly to trim the excess material from the can and maintain the excess material separate from the can. The apparatus discards the excess material after trimming and ejects the trimmed can while the headstock and tailstock assemblies rotate at high speed in a continuous motion.

The present invention is particularly useful for trimming the open ends of aluminum cans. However, the apparatus can also be used to trim the open end of any relatively thin-walled tubular member. As used herein, the term "can" means any hollow, elongated element having a generally circular cross-section.

The apparatus of the present invention generally comprises first and second spindle means associated with a trimmer unit of a headstock assembly and can supporting means associated with a tailstock assembly which are rotated about a horizontal axis and are revolved about a second horizontal axis in a circular path. Secured to the end of the first spindle means is a first rotatable arcuate-shaped cutting element which cooperates in a shearing action with a second rotatable annular cutting element secured to the end of the second spindle means. Both the arcuate-shaped cutting element and the annular cutting element are driven. Means for jointly moving the first and second spindle means in a reciprocating motion relative to the tailstock assembly is provided so that the arcuate-shaped cutting element and the annular cutting element engage the can and cooperate to trim the open upper end of the can.

In operation, a can is positioned between the second spindle means which supports the annular cutting element and the can supporting means which is secured to the end of a rotatable shaft associated with the can supporting means. The tailstock unit provides a vacuum to secure the bottom of the can to the can supporting means and thus maintain the can in a fixed position. The joint and simultaneous reciprocating motion of the first and second spindle means of the trimmer unit positions the upper edge of the can between the annular cutting element of the second spindle means and the arcuate-shaped cutting element of the first spindle means whereby the upper edge of the can is trimmed. The can remains secured to the supporting means while both spindle means are withdrawn, and the scrap or excess material which formed the uneven top of the can is removed from the second spindle means upon contacting a stripper plate. Shortly thereafter, the vacuum is released and the trimmed can is directed to a location separate from the scrap material.

One advantage of the present apparatus is that cans having uniform circumferential cuts about the open upper end are produced efficiently at high speed. The apparatus can be adjusted to trim the can at any point along its length.

Another advantage is that the scrap or excess material trimmed from the can is maintained separate from the trimmed can during the cutting process and is not allowed to fall between the various moving parts to jam the apparatus.

Benefits which result from use of the present apparatus include the efficient, high speed production of cans having uniform and even trimmed edges without the various imperfections normally encountered in the mass production of trimmed cans.

BRIEF DESCRIPTION OF THE DRAWINGS

In the accompanying drawings, which form a portion of this disclosure.

DETAILED DESCRIPTION OF THE INVENTION

Figure 1:
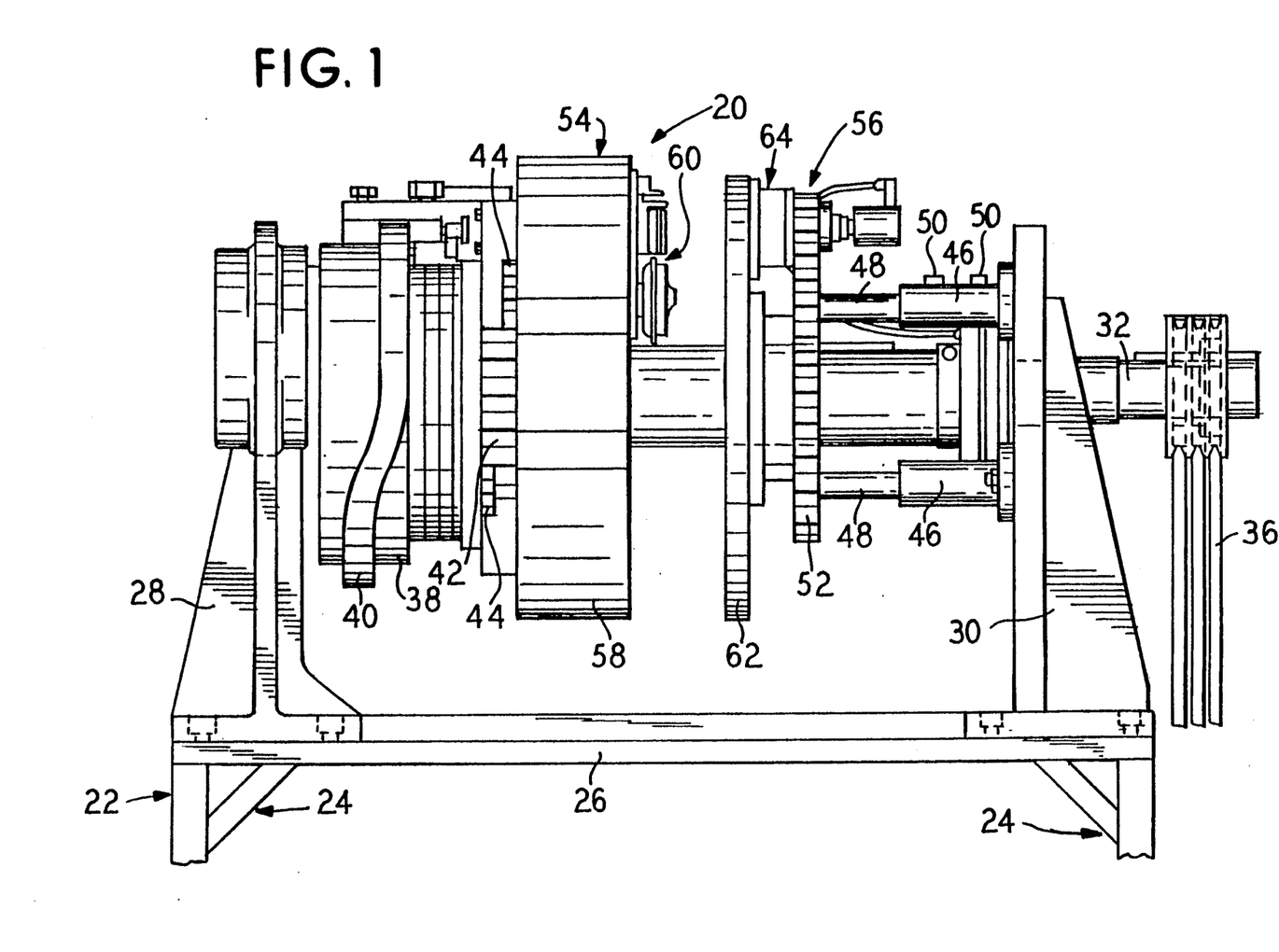
FIG. 1 is a side elevational view of a can trimming apparatus according to the present invention.

Referring to FIG. 1, the can trimming apparatus of the present invention is indicated generally by the reference numeral 20. The apparatus 20 includes a frame 22 which comprises a support assembly 24 and a base platform 26.

A first upright end frame 28 and a second upright end frame 30 are mounted on the base platform 26. Rotatably mounted in the upper periphery of the first and second upright end frames 28 and 30 is a horizontal main shaft 32. Means for rotating the shaft is provided which, in a preferred embodiment, includes a drive unit that is mounted on the support assembly 24 and is operatively connected to the main shaft 32 by means of a belt and pulley arrangement 36.

Preferably secured to the first upright end frame 28 is a cam block 38 which supports a raised cam 40. Associated with the cam block 38 is a stationary trimmer driving gear 42. Both the cam block 38 and the trimmer driving gear 42 include central apertures through which the main shaft 32 rotatably extends. The trimmer driving gear 42 is ridden by a trimmer driven gear 44 as the main shaft 32 rotates.

A support housing 46 which slidably supports a plurality of support shafts 48 is secured to the second upright end frame 30. The support housing 46 includes means for affixing the support shafts 48 to the housing 46 which in the described embodiment comprises bolts 50.

In a preferred embodiment, a can base driving gear 52 is secured to the plurality of support shafts 48. Thus, the can base driving gear 52 is secured to the second upright end frame 30 by the plurality of support shafts 48 and the support housing 46. Both the can base driving gear 52 and the support housing 46 include central apertures through which the main shaft 32 rotatably extends.

A turret-like headstock assembly 54 and a turret-like tailstock assembly 56 are mounted on the main shaft 32.

The headstock assembly 54 includes a main shaft mounted central hub 58 to which are secured three circumferentially-spaced trimmer units 60. The tailstock assembly 56 includes a main shaft mounted tailstock plate 62 in which is carried three circumferentially-spaced can supporting means 64.

Since the three trimmer units 60 and the three can supporting means 64 are identical in construction and operation, only one trimmer unit 60 and one can supporting means 64 will be described in detail. Preferably, the apparatus 20 includes three, five or six circumferentially spaced trimmer units 60 and a corresponding number of can supporting means 64.

Figure 2:
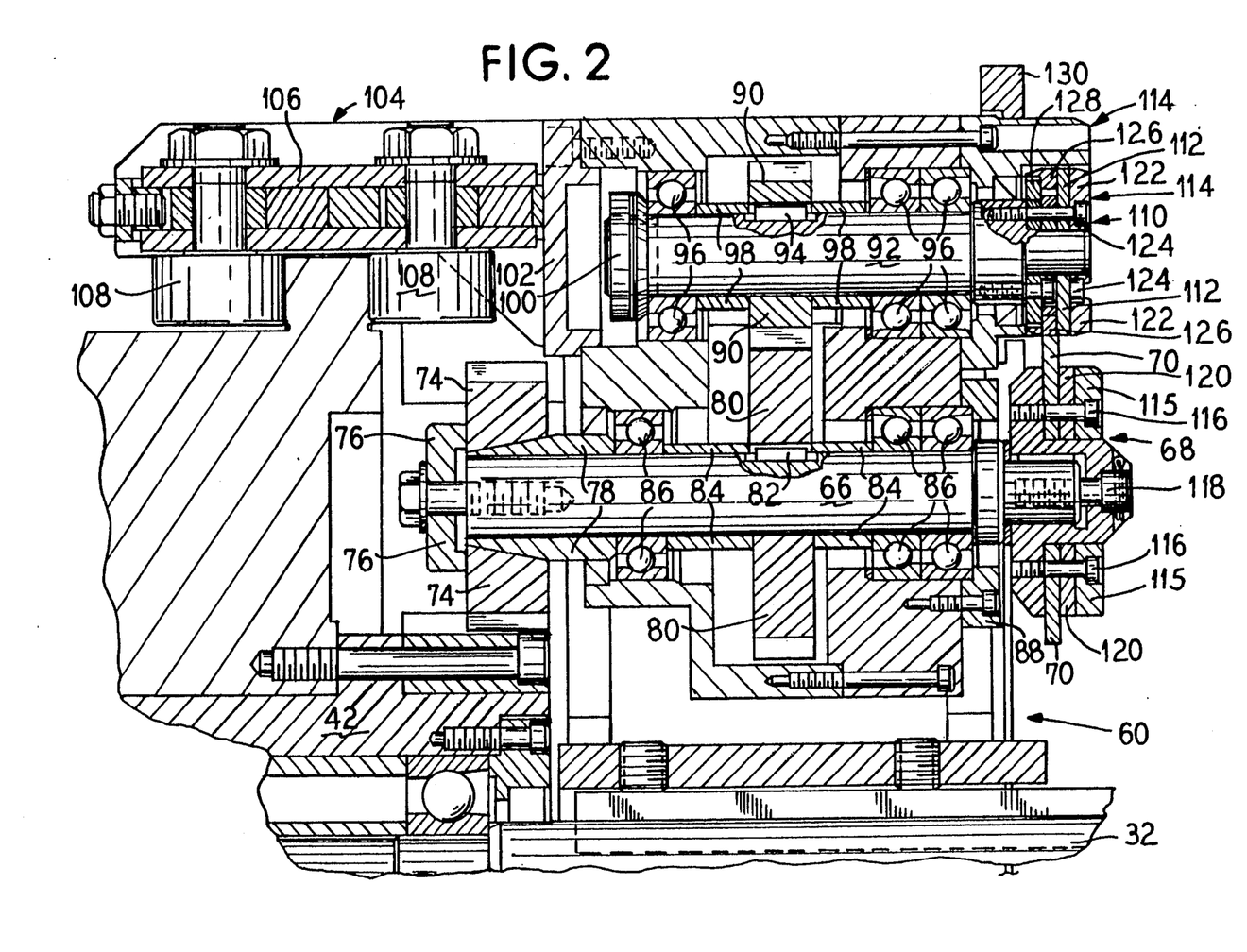
FIG. 2 is a partial sectional view of a headstock trimmer unit.

Referring now to FIG. 2, the headstock assembly 54 is shown in greater detail. The trimmer unit 60 preferably includes first spindle means 66 which is rotatably and slidably disposed within the central hub 58.

Mounted on the first spindle means 66 is the trimmer driven gear 44 which is positioned to ride the trimmer driving gear 42 as the main shaft 32 rotates the central hub 58. In particular, as the main shaft 32 rotates about the central hub 58, the gear assembly causes the first spindle means 66 to spin about its own axis within the central hub 58.

Figure 7:
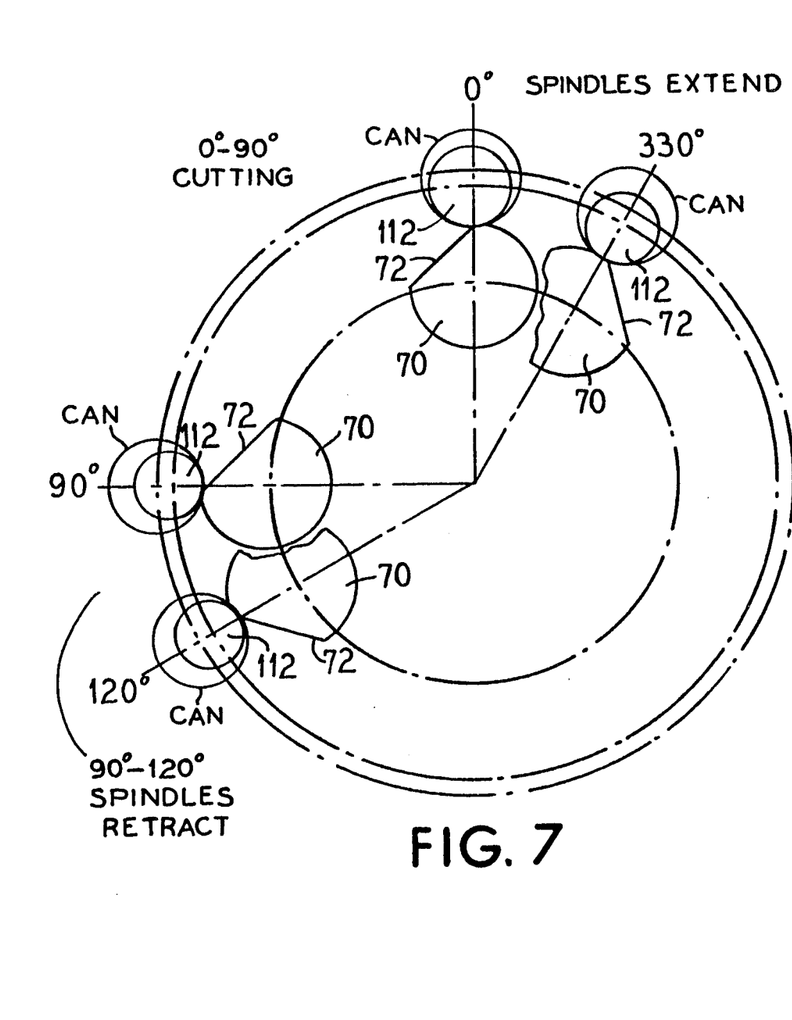

Attached to the first spindle means 66 opposite the trimmer driven gear 44 is a first trimmer head 68 which includes a first rotatable cutting element 70. Preferably, the first rotatable cutting element 70 is generally arcuate-shaped. In particular, the first rotatable cutting element 70 includes a cutting portion which comprises a generally arcuate-shaped edge 71 and a non-cutting portion defined by a cutaway section along the arcuate-shaped edge of the cutting portion. In one embodiment, the non-cutting portion can comprise a generally flat portion 72 (as shown in FIG. 7).

Disposed along the first spindle means 66 opposite the first trimmer head 68 is a first spindle gear 74 which is secured to the first spindle means 66 with a retaining member 76 and is supported by a gear hub 78. The first spindle gear 74 engages the stationary trimmer driving gear 42 to rotate the first spindle means on its axis as the main shaft 32 is rotated.

Also disposed along the first spindle means 66 is a second gear 80 which is secured to the first spindle means 66 with a key 82. Spacer sleeves 84 and a plurality of radial bearing assemblies 86 are positioned along the length of the first spindle means 66 to provide for smooth and efficient rotation of the first spindle means. An additional retaining member 88 can be provided at the end of the first spindle means 66 adjacent the first trimmer head 68 to hold the bearing assemblies in position and to rotatably mount the first spindle means within the headstock assembly.

The second gear 80 of the first spindle means 66 engages a gear 90 which is secured to a second spindle means 92 by a key 94. The second spindle means 92 is likewise rotatably mounted within the headstock assembly by radial bearing assemblies 96, spacer sleeves 98 and retaining members 100.

Attached to one end of the trimmer unit 60 by means of a linear bearing 102 is cam follower means 104. The linear bearing 102 maintains horizontal attachment between the trimmer unit 60 and the cam follower 104. The cam follower means 104 includes a frame member 106 which is secured to the linear bearing 102 and on which is secured a pair of cam followers 108. The cam followers 108 engage the sides of the raised cam 40 as the main shaft 32 rotates the central hub 58 thereby imparting a horizontal reciprocal sliding motion to the trimmer unit 60. The first spindle driven gear 74 and the stationary trimmer driving gear 42 are of sufficient width to maintain working contact as the trimmer unit 60 reciprocates.

In an alternative (but less preferred) embodiment, the raised cam 40 and the cam follower means 104 can be incorporated into the tailstock assembly 56 to provide reciprocal motion for the can supporting means 64.

Attached to the second spindle means 92 opposite cam follower means 104 is a second trimmer head 110 which includes a second rotatable cutting element 112 having a diameter slightly less than the inside diameter of the can. The second rotatable cutting element 112 is preferably annular.

Attached to the second rotatable cutting element 112 is pilot means 114 which is adapted to extend into the inside of the can during the trimming operation. The pilot means 114 can include a plurality of biased extensions along its periphery for contacting the inner surface of the can. When the trimmer unit 60 is extended away from the first upright end frame 28 by the cam follower means 104, the second rotatable cutting element 112 cooperates in a shearing action with a first rotatable cutting element 70.

In particular, the non-cutting portion (represented by the generally flat portion 72 in FIG. 7) of the first rotatable cutting element 70 and the second rotatable cutting element 112 cooperate to allow joint reciprocal movement of the cutting elements as the trimmer unit 60 is moved relative to the tailstock assembly. As the first and second spindle means are moved towards the can, the rotation of the cutting elements is geared so that the sidewall of the can is positioned between the non-cutting portion of the first cutting element 70 and the second cutting element 112. As the cutting elements continue to rotate, the cutting portion of the first cutting element engages the sidewall of the can to start the trimming operation.

The cutting elements are secured to the respective spindle means in the following manner. The first trimmer head 68 receives and supports the first rotatable cutting element 70 which is securely mounted thereon with a cover plate 115 and a plurality of bolts 116 or the like. The first trimmer head 68 in turn is secured to the first spindle means 66 with means which can include a lock screw and cotter pin assembly 118. Spacer means 120 can be provided to adjust the position of the cutting element 70.

The second trimmer head 110 receives and supports the second rotatable cutting element 112 in a similar manner. In particular, a cover plate 122 and a plurality of bolts 124 securely mount the second rotatable cutting element 112 onto the second trimmer head 110 which is in turn secured to the second spindle means 92. Spacer means in the form of a slip ring 126 mounted on a corresponding hub 128 can be provided to adjust the position of the cutting element 112.

The relative positions of the first and second cutting elements in FIG. 2 provide a slight burr (if any burr is formed) on the inner surface of the trimmed edge of the can. As is known in the art, a burr can be formed if the cutting elements are slightly out of alignment due to the wearing of parts after prolonged use. One of the benefits of the present apparatus, of course, is that any burrs that may be formed are minimal or virtually nonexistent.

Figure 3:
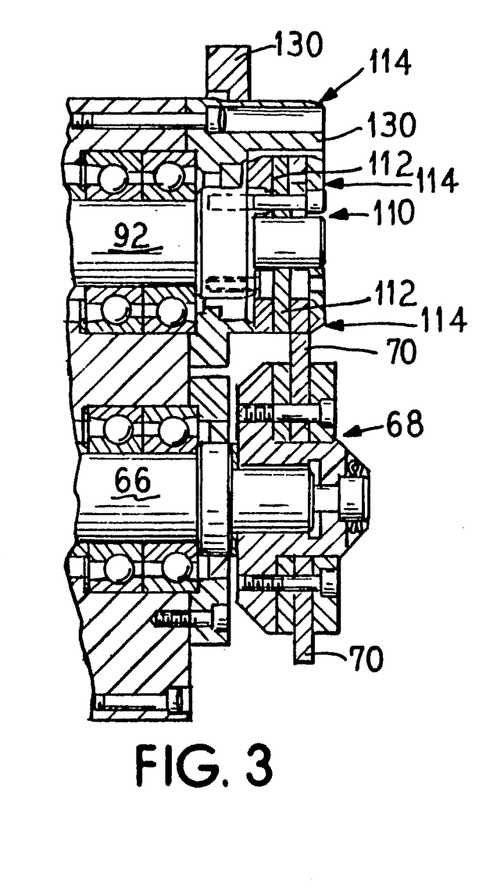
FIG. 3 is a partial sectional view showing an alternative embodiment for arrangement of the cutting elements of FIG. 2.

FIG. 3 illustrates a reversal in the relative positions of the first and second cutting elements which is accomplished by changing the position of the spacer means associated with each cutting element. This orientation of the first and second cutting elements provides a slight burr (if any burr is formed) on the outer surface of the trimmed edge of the can.

Any preference for the location of any burr (even though it may be minimal) depends on the intended use of the can. Cans used in the beverage or food processing industry may be acceptable if a slight burr is formed on the outer surface of the trimmed edge. Burrs on the inner surface, however, must be avoided. On the other hand, burrs on the inner or the outer surface of the trimmed edge are generally considered suitable for use in the processing of pet food and the like.

Thus, one advantage of this apparatus is that when positioned by cam follower means 104, the second rotatable cutting element 112 and the first rotatable cutting element 70 trim the upper end of the can to produce a smooth edge that is both even and uniform. Cans may be either aluminum or steel with a wall thickness, for example, of between 0.0035 to 0.060 inches (0.089 to 1.53 mm). For satisfactory shearing action, the radial planes of the adjacent edges of the cutting elements may overlap about 0.002 inches (0.051 mm) and the radii of curvature of the adjacent edges of the cutting elements may have a clearance of about 0.0005 to 0.001 inches (0.0127 to 0.0254 mm).

The radial bearing assemblies 86 and 96 maintain a coaxial orientation of the first and second spindle means 66 and 92 and a precise alignment of the first rotatable cutting element 70 and the second rotatable cutting element 112. Thus, the apparatus 20 can be operated for extended periods of time without servicing or replacing the spindle means due to wear of the shafts or the associated sleeves 84 and 98.

In an alternative embodiment, the first and second spindle means can include a spline shaft and ball spline to provide a ball spline assembly. In this embodiment, the shaft of each spindle means is slidably mounted in a spline sleeve by a plurality of ball bearing which are supported in rows by cages as disclosed in U.S. Pat. No. 4,914,990 which issued to the present inventor on Apr. 10, 1990. It is estimated that if the apparatus 20 includes the foregoing ball spline assembly instead of a conventional ball bearing assembly, the apparatus can be operated up to twenty times longer without servicing or replacing the spindle means and the associated bearing assemblies.

When the trimmer unit 60 is retracted inwardly towards the first upright end frame 28 by the cam follower means 104, stripper means comprising a stationary plate 130 associated with the trimmer unit 60 about the spindle means 92 engages the trimmed material for disposal after shearing.

Figure 4:
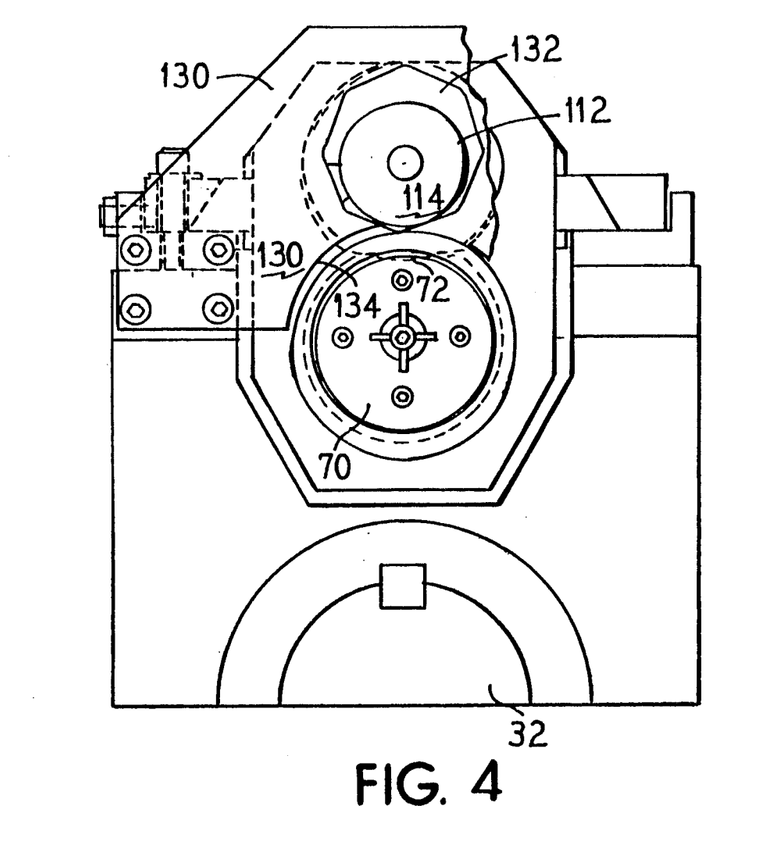
FIG. 4 is a partial end view of the headstock trimmer unit taken along the plane 4—4 of FIG. 2.

With particular reference to FIG. 4, the stationary plate 150 of the stripper means is shown. The stationary plate is secured to the headstock assembly and defines an opening 132 through which the pilot means 114 and the second trimmer head 110 can extend and a cutaway portion 134 through which the first trimmer head 68 can extend. The opening 132 is preferably offset relative to the axis of the pilot means.

As described above, the pilot means 114 and the first and second spindle means 66 and 92 are adapted for joint and simultaneous reciprocal movement relative to the stripper means. The pilot means is advanced for insertion within the can. After the can is trimmed by the shearing action of the cutting elements 70 and 112, the spindle means and the pilot means retract with the trimmed scrap material remaining disposed about the pilot means. As the trimmed scrap material engages the stationary plate, the scrap material is slid off the pilot means for disposal. The length of travel of the pilot means is preferably less than about 2–3 inches, and more preferably about 1 inch.

Figure 5:
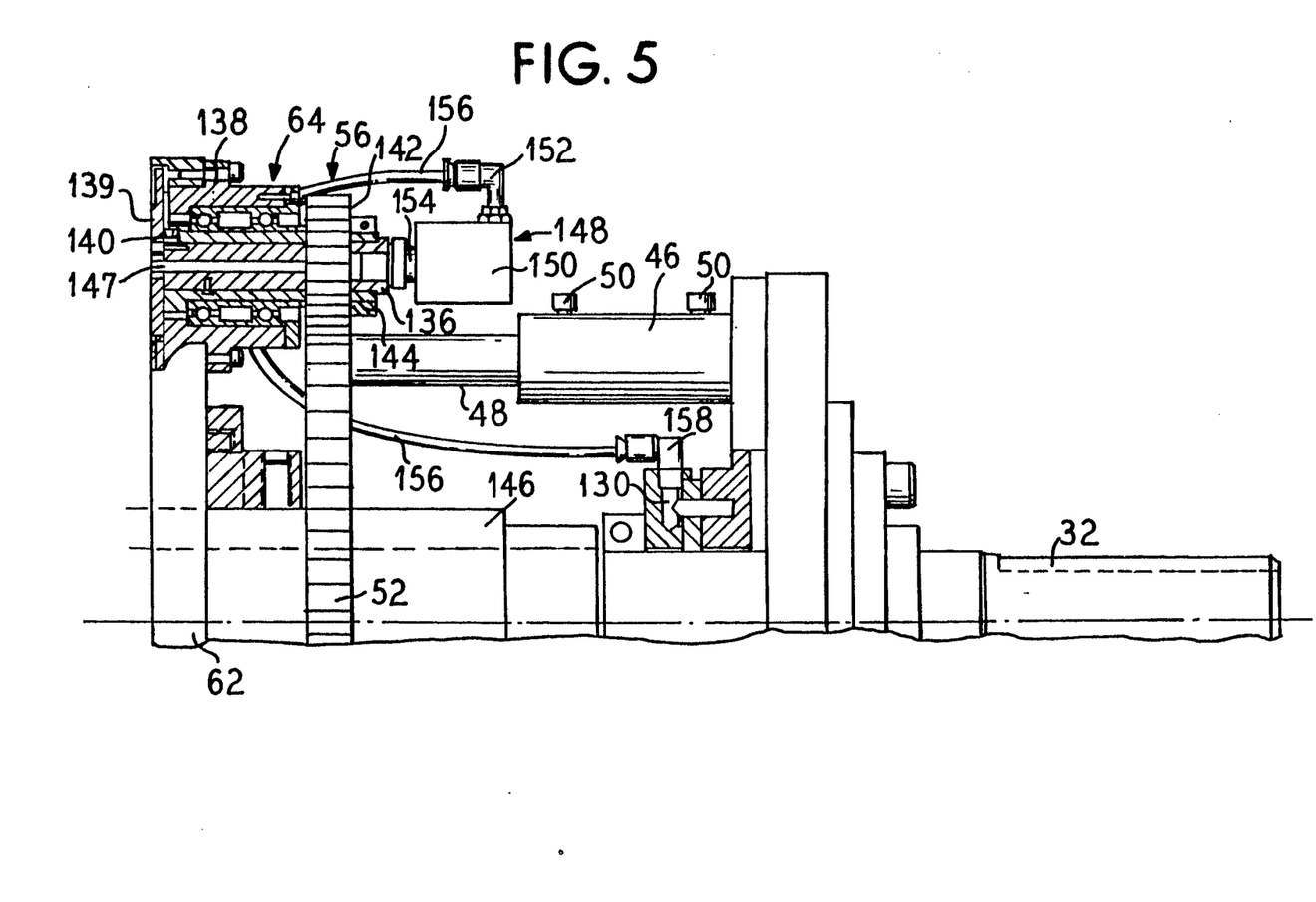
FIG. 5 is a partial, sectional view of a tailstock unit.

Referring now to FIG. 5, the tailstock assembly 56 is shown in greater detail. Contained in the tailstock plate 62 are the can supporting means 64. The can supporting means 64 include a can base shaft 136 which is rotatably disposed in base pad housing 138 which is secured to the tailstock plate 62. While the can base shaft 136 is also capable of horizontally reciprocal movement, in the preferred embodiment no reciprocating action is imparted.

At one end, a can base pad 139 is attached to the can base shaft 136 by a biasing means which in the described embodiment is a spring 140. The can supporting means 64 thus freely rotates with the can base shaft 136 while maintaining a bias in its horizontal orientation.

Mounted on the can supporting means 64 is a can base driven gear 142. The can base driven gear 142 rides the stationary can base driving gear 52 as the main shaft 32 rotates the tailstock plate 62 thus causing the can base shaft 136 to spin on its own axis in the base pad housing 138.

The can base driven gear 142 is also locked horizontally onto the stationary can base driving gear 52 by a locking ring 144. Thus, when the stationary can base driving gear 52 can be adjusted horizontally by loosening the bolts 50 of the support housing 46 and sliding the support shafts 48. The can base shaft 136 is also adjusted accordingly thereby allowing for cans of different heights. The tailstock plate 62 is thus moved along the main shaft 32 during this adjustment. To maintain the driving relationship between the tailstock plate 62 and the main shaft 32, a raised ridge 146 is provided on the main shaft 32 which is keyed into a groove provided on the tailstock plate 62.

The can base shaft 136 includes a central aperture 147 defined in the center of the shaft 136 which opens to the can supporting means 64. Opposite the can supporting means 64, the central aperture is attached to a rotary union 148.

The rotary union 148 includes main housing 150, a male elbow 152, and a rotating shaft 154 having a central passage. The rotary union 148 allows free rotation of the rotating shaft 154 while maintaining gaseous communication between the rotating shaft 154, central passageway and the male elbow 152. The central aperture of the can supporting means 64 is specifically connected to the rotary union 148 thus establishing gaseous communication from the can supporting means 64 to the male elbow 152.

The male elbow 152 is attached via a flexible hose 156 to a second male elbow 158 attached to a vacuum plate 160. The vacuum plate 160 is attached to the main shaft 32. The vacuum plate 160 is also attached to a source of vacuum (not shown) in conventional manner and thus supplies the can supporting means 64 with suction as explained in greater detail below.

In particular, according to the present invention, can edges are trimmed by the cooperative shearing action of the first, and second rotatable cutting elements. This action provides the clean cut that is necessary to form a smooth edge as long as the can is properly positioned between the cutting elements. But imperfections in the edge can occur as a result of the wear associated with movement of the trimmer unit 58 as it reciprocates towards and away from the shearing position. Because of the precision required to form a clean cut, even the smallest deviation (for example, 0.0001 inch) from the coaxial orientation of the shaft as a result of wear can produce imperfections in the edges of the trimmed can.

As untrimmed cans are fed into the can trimming apparatus, the cans are held against the can supporting means 64 by the applied vacuum. During the trimming cycle, pilot means 114 holds the trimmed annular edge away from the can as the pilot means is retracted. After trimming, the trimmed annular edge is separated from the pilot means upon contact with the stripper means and is discharged in a first discharge chute while the can is held on the can supporting means 64. The main shaft 32 continues to rotate so the trimmed can is discharged into a separate discharge chute.

Figure 6:
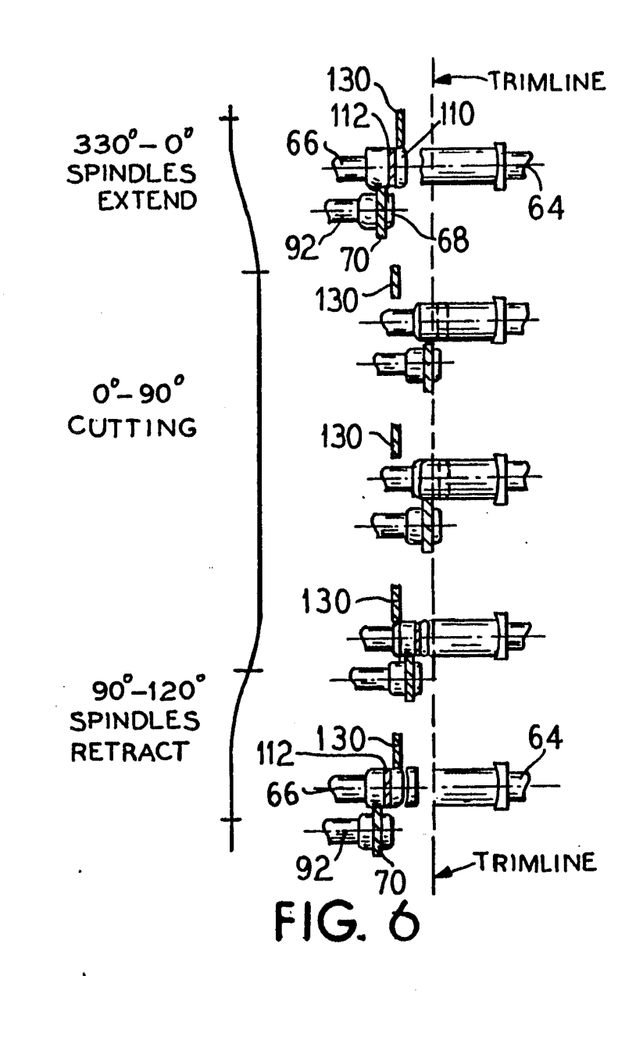
FIGS. 6 and 7 are schematic diagrams showing the operational sequence of the present apparatus.

Referring to FIGS. 6 and 7, the sequence of operation according to a preferred embodiment of the present apparatus is presented. Initially, cans having an open upper end are fed into the can trimming apparatus 20 by means such as an infeed spiral in conjunction with a starwheel or other can feeding means well known in the art. The cans are positioned on and adhere to the can supporting means 64 as a result of the vacuum. Individual cans are positioned between the retracted trimmer unit 60 and the can supporting means 64.

The apparatus is geared so that the non-cutting portion (for example, the generally flat portion 72) of the first rotatable cutting element 70 is positioned to allow the second rotatable cutting element 112 and the pilot means to easily be inserted in the open end of the can. The edge of each can is then individually trimmed as the second rotatable cutting element 112 and the first rotatable cutting element 70 are brought into a shearing position by rotation. After trimming, the trimmer unit 60 is retracted and the trimmed material is fed by gravity into a scrap chute while the trimmed can remains adhered to the can supporting means by the vacuum. After the can has rotated past the scrap chute, the vacuum is released and the can separates from the can base pad. Thereafter, the can is fed by gravity into the can discharge chute. As the can is discharged, a second can has just been trimmed while a third has just been fed into the trimming device. Thus, in each complete rotation of the main shaft, three (or more) cans are trimmed (depending on the number of trimmer units employed).

As described above, the apparatus can also be constructed with at least one, but preferably three, five or six, circumferentially spaced trimmer units and a corresponding number of associated can supporting means. An apparatus with three trimmer units can trim at least about 300 cans per minute, and an apparatus with five trimmer units 58 can trim at least about 500 cans per minute.

It should be understood that various modifications, changes and variations in addition to those herein discussed may be made in the arrangement, operation and details of construction of the elements disclosed herein without departing from the spirit and scope of the invention.

What is claimed is:
1. An apparatus for trimming cans comprising:
   a headstock assembly supported by shaft means for rotation about an axis including at least one trimmer unit rotatably associated with the headstock assembly along an axis radially disposed from the axis of the shaft means, the trimmer unit comprising first spindle means including a first rotatable cutting element and second spindle means including a second rotatable cutting element;

a tailstock assembly supported by the shaft means for coaxial rotation with the headstock assembly including at least one can supporting means rotatably associated with the tailstock assembly;

means for axially jointly moving the first and second spindle means relative to the tailstock assembly to position a can between the can supporting means and the first and second rotatable cutting elements with the can remaining supported by the can supporting means; and means for rotating the first and second spindle means while the headstock and the tailstock assemblies are rotated about the shaft means whereby the first and second rotatable cutting elements cooperate to trim the cans to a uniform length.

2. The apparatus according to claim 1 wherein the second spindle means includes pilot means for insertion within the can as the can is positioned relative to the first and second cutting elements for trimming.

3. The apparatus of claim 1 wherein the trimmer unit includes stripper means operatively associated with the second spindle means.

4. The apparatus according to claim 1 including means for rotating the trimmer unit on its axis while the headstock and the tailstock assemblies are rotated comprising driving gear concentric with the shaft means and driven gears associated with the first and second spindle means which rotatably engage the stationary driving gear.

5. The apparatus according to claim 1 including means for rotating the can supporting means while the headstock and tailstock assemblies are rotated comprising a stationary driving gear concentric with the shaft means and a driven gear associated with the can supporting means to engage the stationary driving gear.

6. The apparatus according to claim 1 wherein the means for jointly moving the first and second spindle means relative to the tailstock assembly comprises cam means associated with the headstock assembly.

7. The apparatus according to claim 6 wherein the cam means comprises a raised cam and a cam follower operatively associated along the headstock assembly.

8. The apparatus according to claim 1 including means for moving the can supporting means relative to the headstock assembly.

9. The apparatus according to claim 1 wherein the first cutting element is rotatable about the horizontal axis of the first spindle means for cooperation with the second cutting element to trim the can.

10. The apparatus according to claim 1 wherein the can supporting means includes vacuum means for releasably supporting the can.

11. The apparatus according to claim 2 wherein the pilot means includes a plurality of biased extensions at its periphery.

12. The apparatus according to claim 1 wherein the first rotatable cutting element is arcuate-shaped and includes a cutting portion and a non-cutting portion to facilitate placement of an end portion of a can between the first and second rotatable cutting elements.

13. An apparatus for trimming cans comprising:

a headstock assembly supported by shaft means for rotation about a horizontal axis;

at least one trimmer unit rotatably associated with the headstock assembly along an axis radially disposed from the horizontal axis of the headstock assembly, the trimmer unit comprising first spindle means including a first rotatable cutting element and second spindle means including a second rotatable cutting element;

a tailstock assembly supported by the shaft means for coaxial rotation with the headstock assembly;

at least one can supporting means rotatably associated with the tailstock assembly along the axis the second spindle means for supporting the can;

means for moving the trimmer unit relative to the can supporting means to position the can between the first and second rotatable cutting elements; and means for coaxially rotating the headstock and the tailstock assemblies about the shaft means and means for rotating the first and second spindle means and the can supporting means while the headstock and the tailstock assemblies are rotated whereby the first and second rotatable cutting elements cooperate to trim an open end portion from the can.

14. The apparatus according to claim 13 wherein the trimmer unit includes pilot means for insertion within the end portion of the can as the can is positioned relative to the first and second cutting elements for trimming.

15. The apparatus according to claim 14 wherein the trimmer unit includes stripper means operatively associated with the pilot means.

16. The apparatus according to claim 13 including means for rotating the trimmer unit on its axis while the headstock and the tailstock assemblies are rotated comprising a stationary driving gear concentric with the shaft means and driven gears associated with the first and second spindle means which rotatably engage the stationary driving gear.

17. The apparatus according to claim 13 including means for rotating the can supporting means while the headstock and tailstock assemblies are rotated comprising a stationary driving gear concentric with the shaft means and a driven gear associated with the can supporting means to engage the stationary driving gear.

18. The apparatus according to claim 13 wherein the means for moving the trimmer unit relative to the can supporting means comprises cam means associated with the headstock assembly.

19. The apparatus according to claim 18 wherein the cam means comprises a raised cam and a cam follower operatively associated along the headstock assembly.

20. The apparatus according to claim 13 including means for moving, the can supporting means relative to the headstock assembly.

21. The apparatus according to claim 13 wherein the first cutting element is rotatable about the horizontal axis of the first spindle means for cooperation with the second cutting element to trim the can.

22. The apparatus according to claim 13 wherein the can supporting means includes vacuum means for releasably supporting the can.

23. The apparatus according to claim 14 wherein the pilot means includes a plurality of biased extensions at its periphery.

24. The apparatus according to claim 13 wherein the first rotatable cutting element is arcuate-shaped and includes a cutting portion and a non-cutting portion to facilitate placement of an end portion of a can between the first and second rotatable cutting elements.

25. An apparatus for trimming cans comprising:
a headstock assembly supported by shaft means for rotation about a horizontal axis;
at least one trimmer unit rotatably mounted on the headstock assembly along an axis radially disposed from the axis of revolution of the headstock assembly, the trimmer unit including first spindle means having a first rotatable cutting element which is arcuate-shaped secured to one end thereof and second spindle means having a second rotatable cutting element which is annular, the first rotatable cutting element being positioned to cooperate with the second rotatable cutting element to trim an end portion from a can disposed between the cutting elements, the fist rotatable cutting element including a cutting portion and a non-cutting portion to facilitate placement of the end portion of the can between the first and second cutting elements;
a tailstock assembly supported by the shaft means for coaxial rotation with the headstock assembly;
at least one can supporting means rotatably mounted in the tailstock assembly along the same axis as the second spindle means, the can supporting means supporting the lower end of the can so that the end portion of the can is positioned between the second spindle means and the can supporting means;
a raised cam and a cam follower means secured to one end of the headstock assembly, the cam follower means being operatively associated with the raised cam whereby the trimmer unit can axially reciprocate; and
means for rotating the first and second spindle means while the headstock and tailstock assemblies are rotated about the shaft means whereby the first and second rotatable cutting elements cooperate to trim the end portion of the can.

26. The apparatus according to claim 25 wherein the second spindle means includes pilot means for insertion within the can as the can is positioned relative to the first and second cutting elements for trimming.

27. The apparatus of claim 25 wherein the trimmer unit includes stripper means operatively associated with the second spindle means.

28. The apparatus according to claim 25 including means for rotating the trimmer unit on its axis while the headstock and the tailstock assemblies are rotated comprising a stationary driving gear concentric with the shaft means and driven gears associated with the first and second spindle means which rotatably engage the stationary driving gear.

29. The apparatus according to claim 25 including means for rotating the can supporting means while the headstock and tailstock assemblies are rotated comprising a stationary driving gear concentric with the shaft means and a driven gear associated with the can supporting means to engage the stationary driving gear.

30. The apparatus according to claim 25 including means for moving the can supporting means relative to the headstock assembly.

31. The apparatus according to claim 25 wherein the can supporting means includes vacuum means for releasably supporting the can.

32. The apparatus according to claim 26 wherein the pilot means includes a plurality of biased extensions at its periphery.

33. An apparatus for trimming the sidewall of the open end of a cylindrical can having a closed opposite end, said apparatus comprising:
(a) main shaft means supported for axial rotation on a fixed main frame, and including drive means;
(b) a turret-like headstock assembly and a spaced adjacent turret-like tailstock assembly, each supported by said main shaft means for coaxial rotation therewith;
(c) a cam pathway circumferentially defined around said headstock assembly;
(d) a plurality of trimmer units located peripherally in equally spaced relationship about said headstock assembly and an equal plurality of can support means located peripherally in equally spaced relationship about said tailstock assembly;
(e) each said trimmer unit including a pair of spaced parallel rotatable spindle means having a cutting element and driving gear means coupled to said main shaft means, said cutting elements being cooperative with each other to provide peripheral shearing action therebetween, one of said cutting elements having a peripheral cutting portion thereof removed, pilot means for collecting scrap trimmed from a can, cam follower means coupled to said cam pathway for reciprocatorily moving its said associated trimmer unit axially relative to said main shaft means in a manner coordinated with the rotational position of said one cutting element, and stationary plate means for slidably removing scrap from said pilot means; and
(f) each can support means including a can base, an associated rotatable base shaft, driving gear means coupled to said main shaft means, and means for applying reduced gas pressure to said can base during a preselected portion of each single rotation of said main shaft means;
whereby, during a single revolution of said main shaft means, said first and second cutting elements of each said trimmer unit first axially extend over said sidewall of a can that is positioned and held on said can base of said adjacent can support means, next the can sidewall is circumferentially trimmed, and then said first and second cutting elements are retracted with trimmed scrap being separated therefrom.

34. The apparatus according to claim 33 including means for rotating each trimmer unit on its axis while said headstock and said tailstock assemblies are rotated, said means for rotating comprising a stationary driving gear concentric with said main shaft means and driven gears associated with said spindle means which rotatably engage said stationary driving gear.

35. The apparatus according to claim 33 including means for rotating each can supporting means while said headstock and tailstock assemblies are rotated, said means for rotating comprising a stationary driving gear concentric with said main shaft means and a driven gear associated with each can supporting means to engage said stationary driving gear.

36. The apparatus according to claim 33 wherein said cam pathway comprises a raised cam.

37. The apparatus according to claim 33 wherein each said pilot means includes a plurality of biased extensions at its periphery.

38. The apparatus according to claim 33 wherein said one cutting element is arcuate-shaped and includes a cutting portion and a non-cutting portion to facilitate placement of an open end portion of a can sidewall between the cutting elements.

39. An apparatus for trimming the sidewall of the open end of a cylindrical can having a closed opposite end, said apparatus comprising:
  (a) a fixed main frame;
  (b) main shaft means supported for axial rotation on said fixed main frame, and including drive means;
  (c) a turret-like headstock assembly supported by said main shaft means for rotation therewith;
  (d) a turret-like tailstock assembly supported by said main shaft means for coaxial rotation with said headstock assembly in longitudinally adjacent relationship to said headstock assembly;
  (e) a cam pathway circumferentially extending around said headstock assembly;
  (f) a plurality of trimmer units located peripherally in equally spaced relationship about said headstock assembly;
  (g) a plurality of can support means located peripherally in equally spaced relationship about said tailstock assembly, the number of said can support means being equal to the number of said trimmer units;
  (h) each said trimmer unit being in opposed, adjacent relationship to one of said can support means;
  (i) each said trimmer unit comprising
    (1) a pair of spaced parallel rotatable spindle means including bearing means and gear means for rotating each said spindle means as said main shaft means is rotated,
    (2) first and second cutting elements, each one associated with a different forward end of each said spindle means and being rotatable therewith, said cutting elements being cooperative with each other to provide peripheral shearing action therebetween said first cutting element being radially adjacent to said second cutting element relative to said main shaft means,
    (3) said first cutting element having a peripheral cutting portion thereof removed,
    (4) pilot means located adjacent said second cutting element for collecting scrap trimmed from a can,
    (5) cam follower means, including linear bearing means, said cam follower means being associated with said cam pathway, for reciprocatorily extending its associated trimmer unit axially relative to said main shaft means from a rear position to a forward position that is proximate to said adjacent can support means and back to said rear position with a rest period between said successive reciprocal extension movements, and
    (6) said gear means being coordinated with rotation of said spindle means so that said first cutting element has its said removed portion located adjacent to said second cutting element during said reciprocal extension movements;
  (j) stationary plate means associated with said headstock assembly and extending about said second cutting element of each said trimmer unit and located axially forwardly of said rear extension position so that collected scrap on each said pilot means is slidably removed therefrom during each said rearward extension movement; and
  (k) each can support means comprising
    (1) a can base and a rotatable base shaft associated therewith including gear means for rotating said base shaft as said main shaft means is rotated, and
    (2) means for selectively applying reduced gas pressure to said can base so that a can end adjacent said can base is held thereto by said pressure during a preselected portion of each single rotation of said main shaft means;
  whereby, during a single revolution of said main shaft means, said first and second cutting elements of each said trimmer unit first axially extend over said sidewall of a can that is positioned and held on said can base of said adjacent can support means, next the can sidewall is circumferentially trimmed, and then said first and second cutting elements are retracted with trimmed scrap being separated therefrom.

40. The apparatus according to claim 39 including means for rotating each trimmer unit on its axis while said headstock and said tailstock assemblies are rotated, said means for rotating comprising a stationary driving gear concentric with said main shaft means and driven gears associated with said spindle means which rotatably engage said stationary driving gear.

41. The apparatus according to claim 39 including means for rotating each can supporting means while said headstock and tailstock assemblies are rotated, said means for rotating comprising a stationary driving gear concentric with said main shaft means and a driven gear associated with each can supporting means to engage said stationary driving gear.

42. The apparatus according to claim 39 wherein said cam pathway comprises a raised cam.

43. The apparatus according to claim 39 wherein each said pilot means includes a plurality of biased extensions at its periphery.

44. The apparatus according to claim 39 wherein said first cutting element is arcuate-shaped and includes a cutting portion and a non-cutting portion to facilitate placement of an open end portion of a can sidewall between said first and second cutting elements.

* * * * *